United States Patent
Kwon

(10) Patent No.: US 11,674,195 B2
(45) Date of Patent: Jun. 13, 2023

(54) ULTRA-HIGH-STRENGTH COLD-ROLLED PLATED STEEL SHEET AND METHOD FOR MOLDING THE SAME

(71) Applicants: HYUNDAI MOTOR COMPANY, Seoul (KR); KIA CORPORATION, Seoul (KR)

(72) Inventor: Hyuck-Min Kwon, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/491,062

(22) Filed: Sep. 30, 2021

(65) Prior Publication Data

US 2022/0356541 A1 Nov. 10, 2022

(30) Foreign Application Priority Data

May 6, 2021 (KR) .......................... 10-2021-0058722

(51) Int. Cl.
| | |
|---|---|
| *C21D 9/46* | (2006.01) |
| *C21D 8/02* | (2006.01) |
| *C25D 3/22* | (2006.01) |
| *C22C 38/00* | (2006.01) |
| *C22C 38/02* | (2006.01) |
| *C22C 38/04* | (2006.01) |
| *C22C 38/32* | (2006.01) |
| *B32B 15/01* | (2006.01) |

(52) U.S. Cl.
CPC .............. *C21D 9/46* (2013.01); *B32B 15/013* (2013.01); *C21D 8/0236* (2013.01); *C21D 8/0247* (2013.01); *C22C 38/002* (2013.01); *C22C 38/02* (2013.01); *C22C 38/04* (2013.01); *C22C 38/32* (2013.01); *C25D 3/22* (2013.01); *Y10T 428/12799* (2015.01)

(58) Field of Classification Search
None
See application file for complete search history.

(56) References Cited

U.S. PATENT DOCUMENTS

2015/0167111 A1* 6/2015 Nam ...................... C22C 38/44
148/525

FOREIGN PATENT DOCUMENTS

| KR | 101406634 B1 | 6/2014 |
| KR | 101489243 * | 2/2015 |
| KR | 20150061280 * | 6/2015 |

* cited by examiner

*Primary Examiner* — Xiaobei Wang
(74) *Attorney, Agent, or Firm* — Lempia Summerfield Katz LLC

(57) ABSTRACT

The present disclosure relates to an ultra-high-strength plated steel sheet and a method for molding the same, and more particularly, to an ultra-high-strength plated steel sheet having high tensile strength without the occurrence of plating peeling and hydrogen delayed fracture phenomenon during roll forming molding, and a method for molding the same.

3 Claims, 6 Drawing Sheets

[CROSS SECTION AFTER HEAT TREATMENT]

FIG. 1A
FIG. 1B
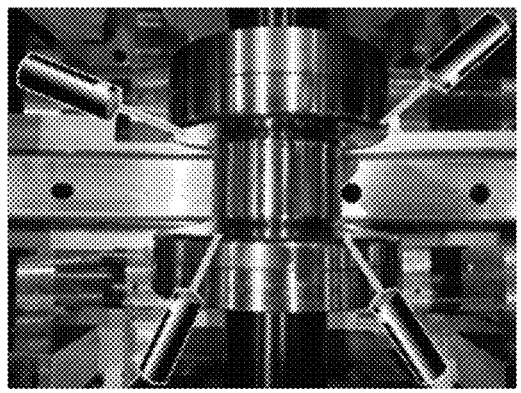
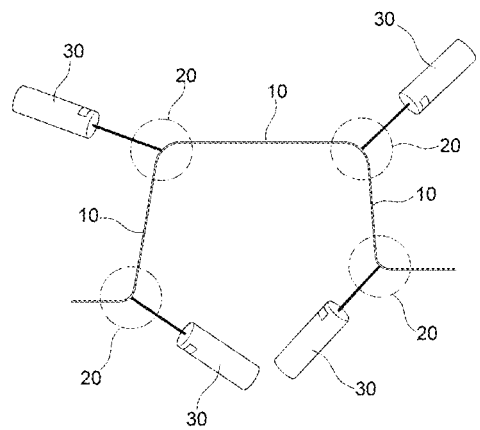
FIG. 2
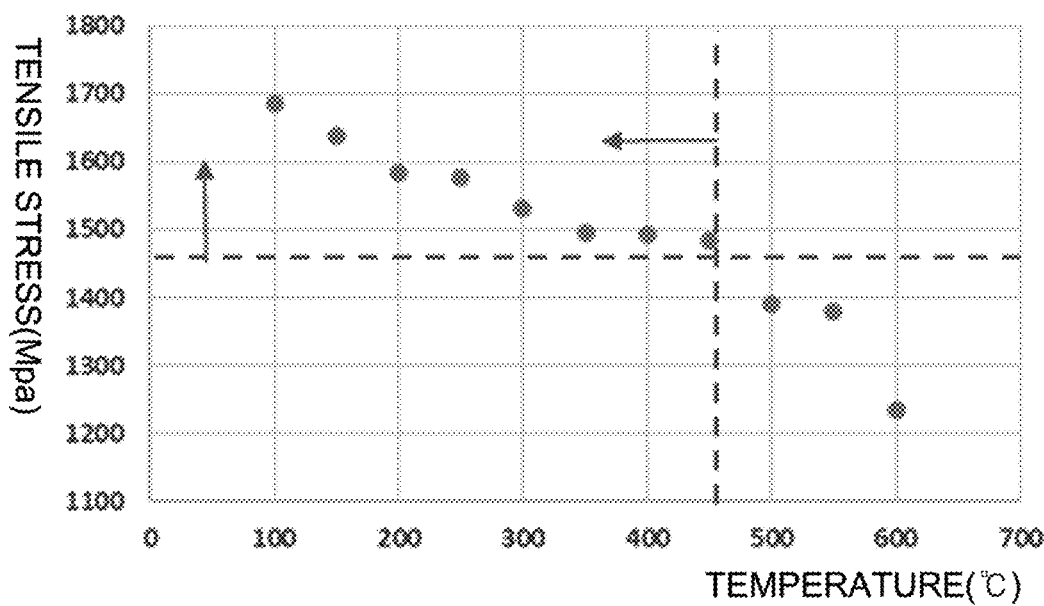

DELTA PHASE

[CROSS SECTION OF
EG PLATED STEEL SHEET]

[CROSS SECTION
AFTER HEAT TREATMENT]

ULTRA-HIGH-STRENGTH COLD-ROLLED PLATED STEEL SHEET AND METHOD FOR MOLDING THE SAME

CROSS-REFERENCE TO RELATED APPLICATIONS

This application claims priority under 35 U.S.C. § 119 to Korean Patent Application No. 10-2021-0058722, filed on May 6, 2021, in the Korean Intellectual Property Office, the disclosure of which is incorporated herein by reference in its entirety.

BACKGROUND

1. Field of the Disclosure

The present disclosure relates to an ultra-high-strength plated steel sheet and a method for molding the same, and more particularly, to an ultra-high-strength plated steel sheet having high tensile strength without the occurrence of plating peeling and hydrogen delayed fracture phenomenon during roll forming molding, and to a method for molding the same.

2. Description of the Related Art

In the global automobile market, the need for ultra-high-strength components is required as the need for improved fuel efficiency and passenger safety is increasing. Thus, the automobile industry is leading the development of ultra-high-strength steel for automobiles, reflecting the demand of the automobile market in response to the trend of weight reduction of automobile bodies and strengthening of crash regulations. Further, as electric vehicles are developed, a need for battery protection is increasing, so that the need for an ultra-high-strength plated steel sheet is increasing.

A hot stamping process is used to expand the application of ultra-high-strength plated steel sheets. However, due to the cost reduction problem of small vehicles, additional application expansion is restricted.

Because the demand is increasing for applying 150 K cold-rolled plated steel sheets to a sector to which existing 120 K cold-rolled plated steel sheets are applied, it has been attempted to change roll forming parts to which existing 120 K cold-rolled plated steel sheets are applied into those to which 150 cold-rolled plated steel sheets are applied. But there are problems in that plating peeling and hydrogen delayed fracture phenomenon occur during a roll forming process.

As a related technology, Korean Patent No. 1406634 has published a technology entitled ULTRA-HIGH STRENGTH STEEL SHEET WITH EXCELLENT COATABILITY AND COLLISION CHARACTERISTICS AND MANUFACTURING METHOD THEREOF.

SUMMARY

The present disclosure has been made in an effort to provide an ultra-high-strength plated steel sheet having high tensile strength without the occurrence of plating peeling and hydrogen delayed fracture phenomenon during a roll forming process. The present disclosure has also been made to provide a method for molding the same.

An embodiment provides an ultra-high-strength cold-rolled plated steel sheet. The ultra-high-strength cold-rolled plated steel sheet includes a plating layer and includes 0.20 to 0.25 wt % of carbon (C), 0.05 to 0.25 wt % of silicon (Si), 0.1 to 1.5 wt % of manganese (Mn), 0.005 to 0.010 wt % of phosphorus (P), 0.002 to 0.003 wt % of sulfur (S), 0.01 to 0.02 wt % of chromium (Cr), and 0.003 to 0.005 wt % of boron (B), in which a tensile strength is 1470 MPa or more.

The plating layer is characterized in that the delta phase is 18% or more of the total plating rate.

The plated steel sheet is characterized in that a low angle boundary ratio in a range of 2° to 15° in the crystal grains is 20% or less.

Another embodiment provides a method for molding an ultra-high-strength cold-rolled plated steel sheet, which includes a plating layer and includes 0.20 to 0.25 wt % of carbon (C), 0.05 to 0.25 wt % of silicon (Si), 0.1 to 1.5 wt % of manganese (Mn), 0.005 to 0.010 wt % of phosphorus (P), 0.002 to 0.003 wt % of sulfur (S), 0.01 to 0.02 wt % of chromium (Cr), and 0.003 to 0.005 wt % of boron (B), in which roll forming molding is performed by performing a local heat treatment using laser at 400 to 450° C. for 4 to 5 seconds during molding.

After the laser heat treatment, the plating layer is characterized in that the delta phase is 18% or more of the total plating rate.

After the laser heat treatment, the low angle boundary ratio in a range of 2° to 15° in the crystal grains is characterized to be 20% or less.

BRIEF DESCRIPTION OF THE DRAWINGS

FIGS. 1A and 1B illustrate a photograph and a schematic view, respectively, of an example in which a cold-rolled plated steel sheet is locally heat-treated during a roll forming molding process.

FIG. 2 is a graph illustrating changes in tensile strength after laser heat treatment of electrogalvanized steel sheets manufactured in Examples and Comparative Examples over temperature.

DETAILED DESCRIPTION OF THE EMBODIMENTS

Figure 3:
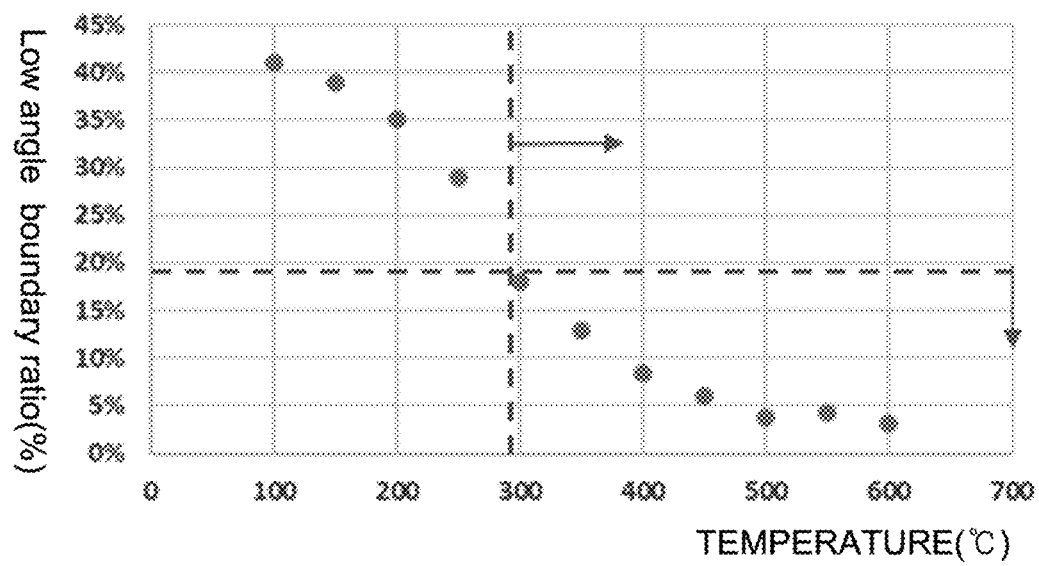
FIG. 3 is a graph illustrating changes in low angle boundary ratio after applying residual stress to the electrogalvanized steel sheets manufactured in Examples and Comparative Examples and then performing laser heat treatment over temperature.

Hereinafter, the configuration of an ultra-high-strength cold-rolled plated steel sheet and a method for molding the same is described with reference to the accompanying drawings.

However, the disclosed drawings are provided as an example for enabling the spirit of the present disclosure to be sufficiently transferred to a person skilled in the art. Accordingly, the present disclosure is not limited to the drawings suggested below and may also be embodied as another aspect.

Unless otherwise defined, the terms used in the specification of the present disclosure have meanings that may be understood by a person with ordinary skill in the art to which the present disclosure pertains, and the detailed description on the publicly known functions and configurations, which may unnecessarily obscure the gist of the present disclosure, has been omitted from the following description and accompanying drawings.

An ultra-high-strength plated steel sheet according to an embodiment includes a plating layer and includes 0.20 to 0.25 wt % of carbon (C), 0.05 to 0.25 wt % of silicon (Si), 0.1 to 1.5 wt % of manganese (Mn), 0.005 to 0.010 wt % of phosphorus (P), 0.002 to 0.003 wt % of sulfur (S), 0.01 to 0.02 wt % of chromium (Cr), and 0.003 to 0.005 wt % of boron (B).

Carbon (C) is an element which determines the strength and hardness of steel and is added for the purpose of securing the tensile strength of a steel material. Carbon (C) may be added in an amount of 0.20 to 0.25 wt % based on the total weight of the steel sheet according to an embodiment. When carbon (C) is added in an amount of less than 0.20 wt %, it may be difficult to secure sufficient strength, and when carbon (C) is added in an amount of more than 0.25 wt %, cracks may occur and the ductility may be lowered.

Silicon (Si) is an element that strengthens solid solution and increases the yield strength of a steel sheet by reducing the crystal grain size due to the solid solution effect. When an appropriate amount of silicon is added to steel to which a large amount of manganese (Mn) is added, it is possible to prevent the formation of a thick manganese oxide layer formed after rolling on a cold-rolled steel sheet. It is also possible to prevent corrosion and maintain an excellent surface quality as an electroplating material of a base steel sheet. However, when the amount of silicon added is too high, the coatability may be lowered. In consideration of this point, silicon (Si) may be added in an amount of 0.05 to 0.25 wt % based on the total weight of the steel sheet according to an embodiment.

Manganese (Mn), along with carbon, is an element for stabilizing an austenite phase. Manganese (Mn) may be added in an amount of 0.1 to 1.5 wt % based on the total weight of the steel sheet according to an embodiment. When the content of manganese (Mn) is less than 0.1 wt %, the crystal grain refinement effect is insufficient. In contrast, when the content of manganese (Mn) is more than 1.5 wt %, there are problems in that cracks may occur, and the content is disadvantageous in terms of cost.

Phosphorus (P) is an element which easily causes segregation and inhibits the toughness of steel. Phosphorus (P) may be added in an amount of 0.005 to 0.010 wt % based on the total weight of the steel sheet according to an embodiment. When the content of phosphorus (P) exceeds 0.010 wt %, segregation may be generated and the processability of steel may be reduced.

Sulfur (S) is an element which inhibits processability and physical properties. Sulfur (S) may be added in an amount of 0.002 to 0.003 wt % based on the total weight of the steel sheet according to an embodiment. When sulfur (S) is included in an amount more than 0.003 wt %, coarse manganese sulfide may be formed to generate defects such as flange cracks.

Chromium (Cr) is added for the purpose of improving the coatability and enhancing the strength, of the steel sheet. Chromium (Cr) may be added in an amount of 0.01 to 0.02 wt % based on the total weight of the steel sheet according to an embodiment. There are problems in that when the content of chromium (Cr) is less than 0.01 wt %, it is difficult to obtain the above-described effect, and when the content is more than 0.02 wt %, the toughness is lowered.

Boron (B) is added for the purpose of securing soft martensitic hardenability and refining the crystal grains. Boron (B) may be added in an amount of 0.003 to 0.005 wt % based on the total weight of the steel sheet according to an embodiment. When the content of boron (b) is less than 0.003 wt %, the effect of improving hardenability is insufficient. In contrast, when the content of boron (B) is greater than 0.005 wt %, an embrittlement risk and an elongation deterioration risk are increased.

The cold-rolled plated steel sheet includes the above-described elemental composition, includes a plating layer, and has a tensile strength of 1470 MPa or more.

In the related art, in such an ultra-high-strength cold-rolled plated steel sheet, a surface plating peeling phenomenon has occurred during a roll forming molding process. The present disclosure has been made in an effort to solve the plating peeling phenomenon through the alloying of the plating layer and has been made in an effort to remove residual stress and solve the hydrogen delayed fracture without significantly lowering the strength for this purpose.

For this purpose, when the plating layer of the steel sheet satisfies that the delta phase is 18% or more of the total plating ratio, the plating peeling may be alleviated. In addition, the residual stress of the plated steel sheet may be measured using an electron backscatter diffraction (EBSD) pattern analyzer for a low angle boundary ratio in a range of 2° to 15° in the crystal grains. When the Low angle boundary ratio is 20% or less, hydrogen delayed fracture can be prevented.

Hereinafter, the present disclosure is described in detail with reference to accompanying drawings.

FIGS. 1A and 1B illustrate a photograph and a schematic view, respectively, of an example in which a cold-rolled plated steel sheet according to an embodiment is locally heat-treated during a roll forming molding process.

For this purpose, a cold-rolled plated steel sheet 10 having the above-described composition is locally heat-treated using a laser 30 at 400 to 450° C. at the time of molding, and roll forming is performed.

The time for performing the local heat treatment using the laser 30 may be 4 to 5 seconds.

In the roll forming molding, stress is concentrated on a bent portion 20, and the plating peeling of an intensive electrogalvanized plating occurs on the bent portion 20. Then, the hydrogen delayed fracture also occurs while the largest residual stress is concentrated on the bent portion.

In order to solve this, the bent portion 20 may be molded and at the same time, a local heat treatment using a laser may be performed to alloy a surface plating and remove the residual stress applied during molding.

In this case, when the local heat treatment temperature is too high, annealing may occur to lower the strength and the plating layer may be oxidized, so that the heat treatment temperature is an important factor.

An electrogalvanized steel sheet may be produced by attaching zinc onto a steel sheet, which easily undergoes plating peeling even at a low molding pressure. However, a delta phase may be generated by a plating layer alloying process through a laser heat treatment to secure a soft structure, and when such a delta phase is 18% or more of the total plating ratio, plating peeling may be alleviated.

When the local heat treatment temperature is less than 400° C., the delta phase becomes less than 18% and a zeta phase is mainly generated, so that plating peeling may occur.

There are several methods for measuring the residual stress of a material. One of the methods may measure the residual stress according to how many low angle boundaries of 2° to 15° occur in the crystal grains using an electron backscatter diffraction (EBSD) pattern analyzer.

In this case, in order to alleviate the hydrogen delayed fracture, which is a problem in the ultra-high-strength cold-rolled plated steel sheet, the residual stress generated during roll forming needs to be eliminated. For this purpose, when laser heat treatment is applied, residual stress may be significantly reduced from 300° C.

When the ultra-high-strength cold-rolled plated steel sheet is laser-heat-treated at a temperature higher than 450° C., the strength is decreased, so that it is difficult to satisfy the collision performance. Therefore, a heat treatment temperature for preventing plating peeling and hydrogen delayed fracture may be in a range of 400 to 450° C.

Hereinafter, the present disclosure is described in more detail through Examples.

Experimental Examples

An electrogalvanized steel sheet having the composition shown in the following Table 1 was laser-heat-treated under the temperature conditions shown in Table 2, and the changes in physical properties associated therewith were measured as follows. The results are shown in FIGS. 2 to 9 and Table 2.

TABLE 1

| Component (wt %) | | | | | | |
|---|---|---|---|---|---|---|
| C | Si | Mn | P | S | Cr | B |
| 0.20 to 0.25 | 0.05 to 0.25 | 0.1 to 1.5 | 0.005 to 0.010 | 0.002 to 0.003 | 0.01 to 0.02 | 0.003 to 0.005 |

TABLE 2

| Classification | Temperature (° C.) | Material strength after laser heat treatment (MPa) | Low angle boundary ratio (%) | Ratio (%) of delta phase in plating layer after heat treatment | Presence or absence of plating peeling | Presence or absence of hydrogen delayed fracture cracks |
|---|---|---|---|---|---|---|
| Comparative Example 1 | 100 | 1685 | 41 | 2.4 | o | o |
| Comparative Example 2 | 150 | 1639 | 39 | 3.5 | o | o |
| Comparative Example 3 | 200 | 1583 | 35 | 6.7 | o | o |
| Comparative Example 4 | 250 | 1576 | 29 | 8.8 | o | o |
| Comparative Example 5 | 300 | 1532 | 18 | 11.1 | o | x |
| Comparative Example 6 | 350 | 1495 | 13 | 14.5 | o | x |
| Example 1 | 400 | 1493 | 8.50 | 18.3 | x | x |
| Example 2 | 450 | 1485 | 6.10 | 20.2 | x | x |
| Comparative Example 7 | 500 | 1392 | 3.80 | 21.6 | x | x |
| Comparative Example 8 | 550 | 1379 | 4.30 | 23.7 | x | x |
| Comparative Example 9 | 600 | 1234 | 3.20 | 22.8 | x | x |

Changes in Strength of Material after Laser Heat Treatment

After laser heat treatment was performed on the manufactured electrogalvanized steel sheet over temperature, the tensile strength was measured. The results are shown in the graph of FIG. 2.

Referring to the graph in FIG. 2, when heat treatment is performed at more than 450° C., it can be observed that the collision performance for battery protection is insufficient, so that laser heat treatment needs to be performed at 450° C. or lower to secure the tensile strength of the material.

Change in Low Angle Boundary Ratio Over Laser Temperature

After 5% Pre strain was applied to the manufactured electrogalvanized steel sheet to add residual stress, the residual stress was measured using an EBSD after laser heat treatment over temperature for 2 seconds and is shown in FIG. 3.

Referring to the graph of FIG. 3, it can be seen that the residual stress is significantly reduced from 300° C. and the low angle boundary ratio is measured at less than 20%.

Observation of Presence or Absence of Plating Peeling after Laser Heat Treatment A delta phase is generated in the manufactured electrogalvanized steel sheet after laser heat treatment for 4 seconds. A graph of the delta phase formation ratio over temperature is illustrated in FIGS. 4A and 4B.

Figure 4A:
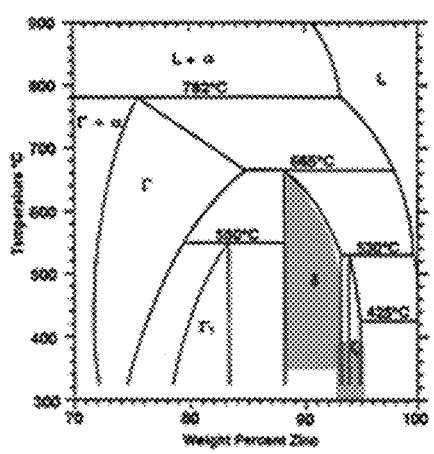
FIGS. 4A and 4B are graphs illustrating a delta phase generation ratio after laser heat treatment of electrogalvanized steel sheets manufactured in Examples and Comparative Examples over temperature.
Figure 4B:
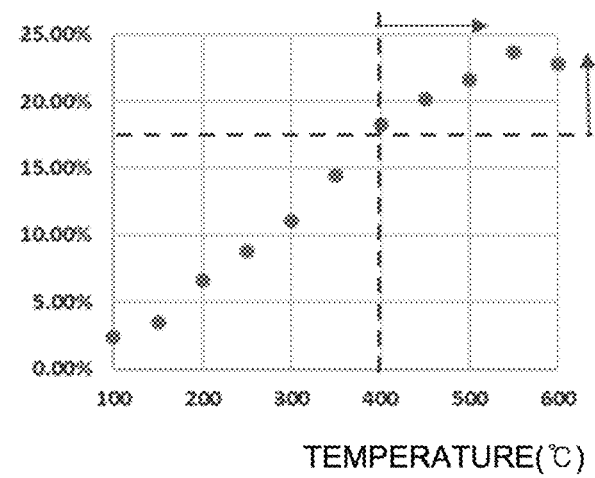

Referring to the graphs of FIGS. 4A and 4B, it can be confirmed that, when the heat treatment is performed at a temperature of 400° C. or higher, the plating peeling is alleviated while the delta phase becomes 18% or more of the total plating ratio.

Figure 5A:
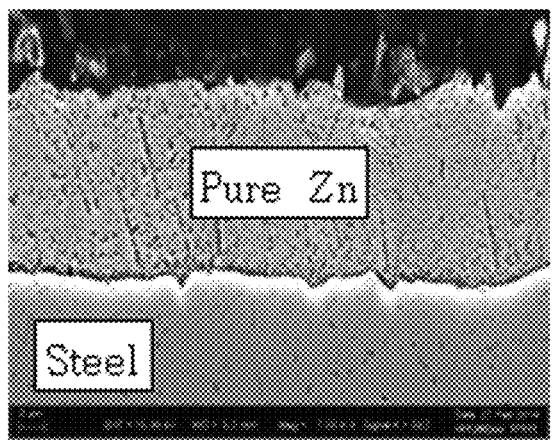
FIGS. 5A and 5B depict a set of photographs illustrating a cross section of an electrogalvanized steel sheet manufactured in Example 1 before and after laser heat treatment.
Figure 5B:
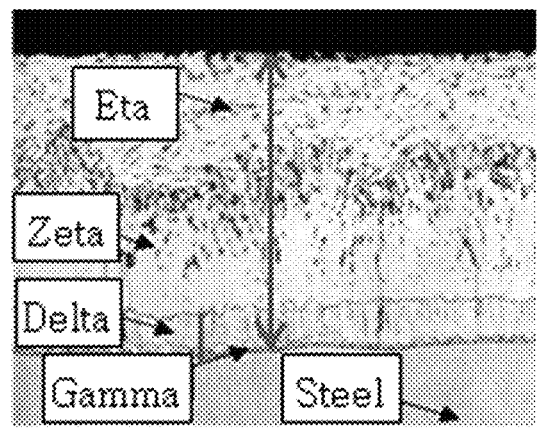

Photographs illustrating a cross section of the electrogalvanized steel sheet of Example 1 before heat treatment and after laser heat treatment are illustrated in FIGS. 5A and 5B.

Referring to the cross-sectional photographs of FIGS. 5A and 5B, the cross section of the electrogalvanized steel sheet before the heat treatment depicted in FIG. 5A is performed shows pure zinc attached to the upper side of the steel. Plating peeling easily occurs even at a low molding pressure.

However, after the heat treatment is performed, as depicted in FIG. 5B as seen in the cross section, a δ1 (delta) phase may be generated by the plating layer alloying process through laser heat treatment to secure a ductile soft structure.

In contrast, when the heat treatment temperature is not sufficient and the delta phase is formed at less than 18%, a brittle ζ (zeta) phase is mainly generated. Plating peeling occurs and thus is not alleviated.

Figure 6A:
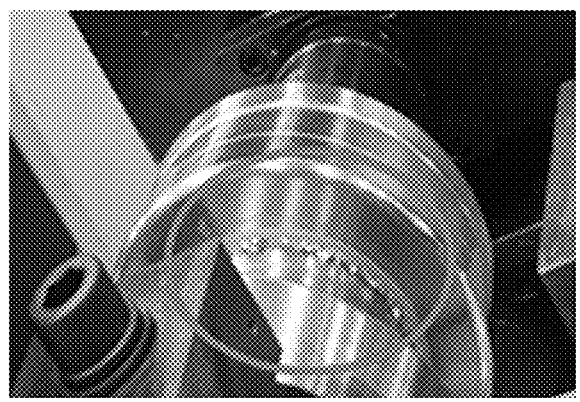
FIGS. 6A and 6B are a photographs of the electrogalvanized steel sheet of Example 1, which is roll forming molded by the steel sheet before and after the laser heat treatment.
Figure 6B:
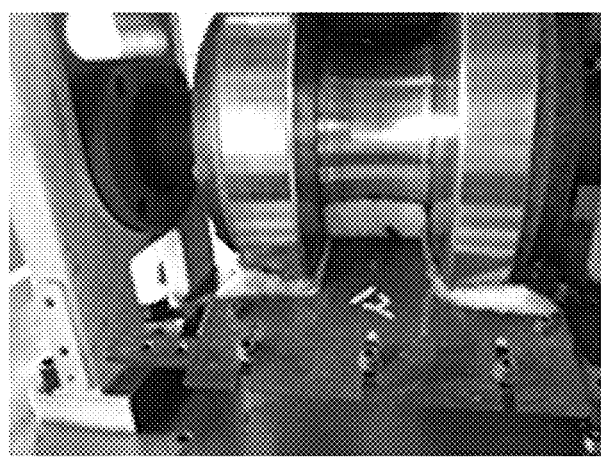
Figure 7:
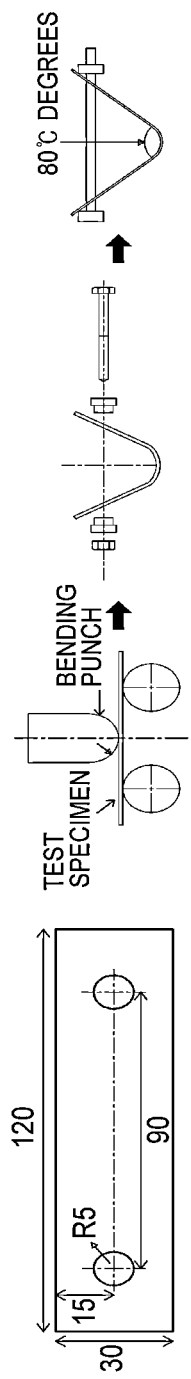
FIG. 7 is a schematically illustrated view of an 80-degree bending hydrogen delayed fracture evaluation method.

Furthermore, photographs of the electrogalvanized steel sheet of Example 1 that have been roll formed before and after the laser heat treatment are illustrated in FIGS. 6A and 6B.

As illustrated in FIG. 6A, in the case of the steel sheet, which is not laser-heat-treated, a number of peelings of the electrogalvanized layer occurred during roll forming molding. However, as illustrated in FIG. 6B, it could be observed that the peeling of the electrogalvanized layer did not occur during roll forming molding after laser heat treatment. Therefore, it could be confirmed that the plating peeling was alleviated when the electrogalvanized steel sheet was laser-heat-treated at 400° C. or higher.

Observation of Presence or Absence of Hydrogen Delayed Fracture after Laser Heat Treatment The manufactured electrogalvanized steel sheet was measured using an 80-degree bending hydrogen delayed fracture evaluation method. For this purpose, an 80-degree bent test specimen was prepared by bending the electrogalvanized steel sheet manufactured at 80 degrees by the process schematically illustrated in FIG. 7. After such preparation, the presence or absence of cracks was observed by immersing the manufactured 80-degree bent test specimen in a 0.1 N HCl solution for 300 hours as illustrated in the photographic drawing of FIG. 8. The results of the occurrence of cracks are illustrated in FIG. 9.

Figures 8, 9:
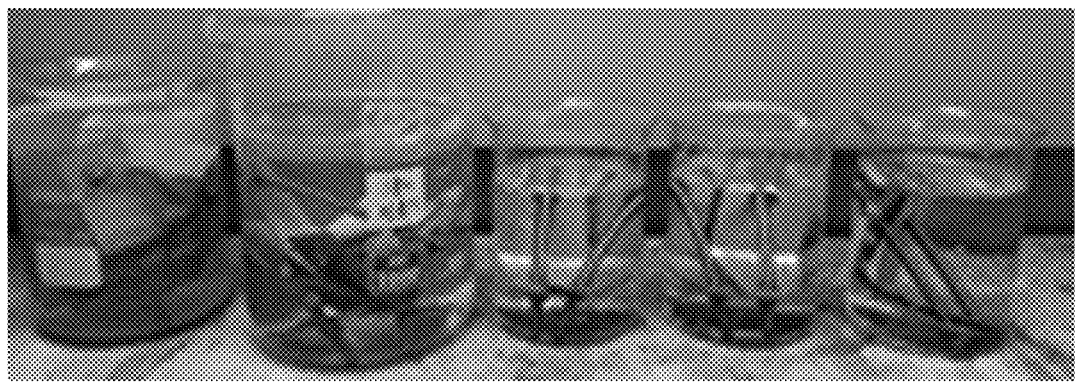
FIG. 8 is a photograph illustrating how the electrogalvanized steel sheet test specimens prepared in Examples and Comparative Examples are used as 80-degree bent test specimens and immersed in a 0.1 N HCl solution for 300 hours.
FIG. 9 is a photograph illustrating whether cracks occurred after laser heat treatment of the electrogalvanized steel sheets manufactured in Examples and Comparative Examples over temperature.

As a result, as illustrated in Table 2 and FIG. 9, it can be confirmed that the hydrogen delayed fracture cracks which had occurred until the heat treatment was performed at 250° C. did not occur when the heat treatment was performed at 300° C. or higher.

Therefore, according to the above-described Experimental Examples, a strength of 1470 MPa or more is required to secure a collision performance for battery protection. Additionally, a low angle boundary ratio of 20% or less is required to remove a residual stress. Furthermore, only when the ratio of a soft delta structure of the plating layer is 18% or more of the total plating ratio after a heat treatment is performed to secure the quality of a roll forming molded article, the plating peeling does not occur, and no hydrogen delayed fracture cracks should occur.

It can be seen that all of these conditions are satisfied when the laser heat treatment is performed in the temperature ranges of Examples 1 and 2 of the above-described Table 2.

According to the present disclosure, it is possible to provide an ultra-high-strength plated steel sheet having high tensile strength without the occurrence of plating peeling and hydrogen delayed fracture phenomenon during a roll forming process, and a method for molding the same.

What is claimed is:

1. An ultra-high-strength cold-rolled plated steel sheet comprising:
a zinc plating layer,
wherein a composition of the ultra-high-strength cold-rolled plated steel sheet comprises:
0.20 to 0.25 wt % of carbon (C);
0.05 to 0.25 wt % of silicon (Si);
0.1 to 1.5 wt % of manganese (Mn);
0.005 to 0.010 wt % of phosphorus (P);
0.002 to 0.003 wt % of sulfur (S);
0.01 to 0.02 wt % of chromium (Cr); and
0.003 to 0.005 wt % of boron (B),
wherein a delta phase of the zinc plating layer is 18% or more of a total plating rate, and
wherein a low angle boundary ratio of the ultra-high-strength cold-rolled plated steel sheet in a range of 2° to 15° in crystal grains of the zinc plating layer is 20% or less.

2. The ultra-high-strength cold-rolled plated steel sheet of claim 1, wherein the ultra-high-strength cold-rolled plated steel sheet has a tensile strength of 1470 MPa or more.

3. A method for molding an ultra-high-strength cold-rolled plated steel sheet, the method comprising:
providing a steel sheet having a zinc plating layer and a composition comprising: 0.20 to 0.25 wt % of carbon (C), 0.05 to 0.25 wt % of silicon (Si), 0.1 to 1.5 wt % of manganese (Mn), 0.005 to 0.010 wt % of phosphorus (P), 0.002 to 0.003 wt % of sulfur (S), 0.01 to 0.02 wt % of chromium (Cr), and 0.003 to 0.005 wt % of boron (B); and
performing a roll forming molding of the zinc plated steel sheet by a local heat treatment using a laser at 400 to 450° C., wherein, after the local heat treatment, a delta phase of the zinc plating layer is 18% or more of a total plating rate and a low angle boundary ratio of the ultra-high-strength cold-rolled plated steel sheet in a range of 2° to 15° in crystal grains of the zinc plating layer is 20% or less.

* * * * *